July 12, 1955 L. L. CARRICK ET AL 2,713,079
BATTERY PLATE
Filed April 15, 1952 2 Sheets-Sheet 1
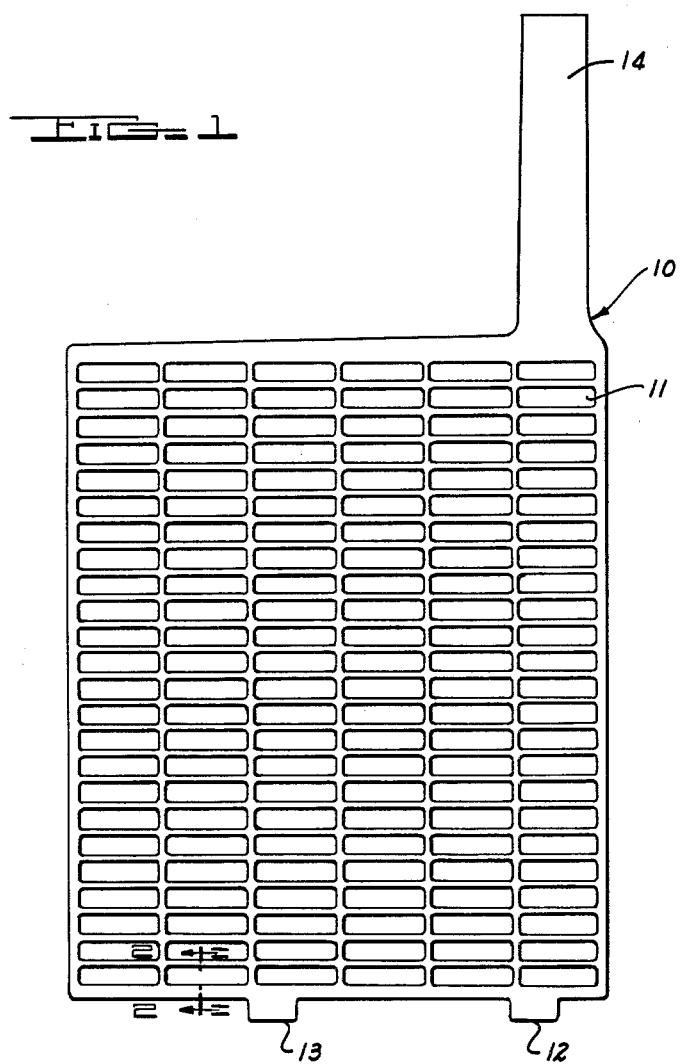
INVENTORS
Leo L. Carrick
John M. Stapleton
BY
Archer M. Smith
ATTORNEY July 12, 1955 L. L. CARRICK ET AL 2,713,079
BATTERY PLATE
Filed April 15, 1952 2 Sheets-Sheet 2
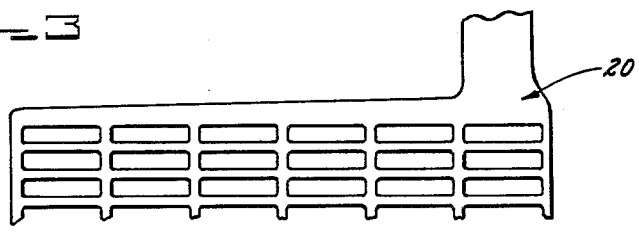
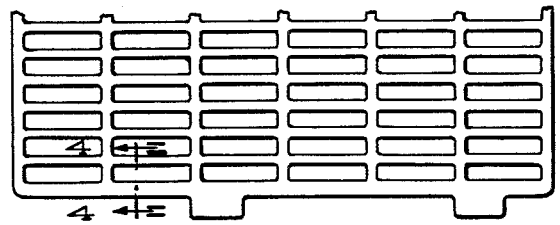
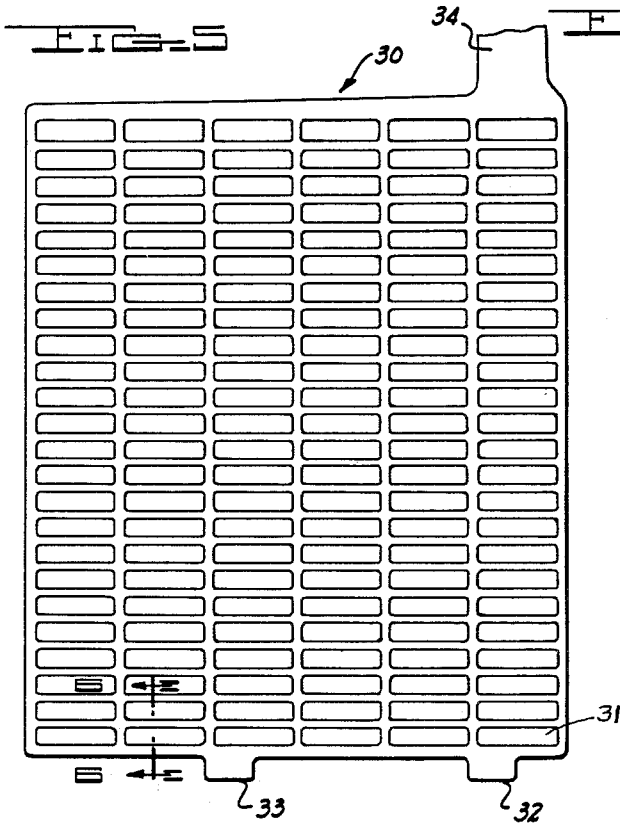
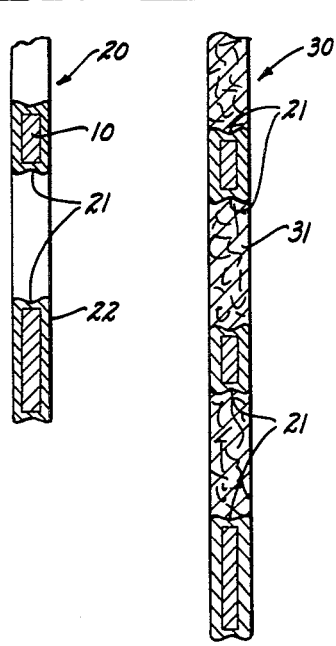
INVENTORS.
LEO L. CARRICK
JOHN M. STAPLETON
BY
Archer M. Smith
ATTORNEY

United States Patent Office 2,713,079
Patented July 12, 1955

2,713,079

BATTERY PLATE

Leo L. Carrick, Ann Arbor, and John M. Stapleton, Breckenridge, Mich., assignors to the Regents of the University of Michigan, Ann Arbor, Mich., a constitutional corporation of Michigan Application April 15, 1952, Serial No. 282,341

2 Claims. (Cl. 136—39)

The present invention relates to improvements in plates for electrical storage batteries and more particularly to such batteries of the "secondary" or "storage" types.

It has been the aim of the electric storage battery manufacturers to produce from lead-antimony grids and lead oxide paste a secondary battery that will weigh less and have a greater watt-hour efficiency per pound of finished battery at low temperatures in the order of −65° F. to −75° F. Such batteries as iron-nickel and cadmium-nickel and batteries which have calcium-lead grids or lead-silver grids or lightweight metal grids with a barrier coat of copper, iron and lead, or lightweight metal grids coated with insulating lacquer, resin insulation, rubber compound or some suitable insulating layer, which is subsequently coated with lead, all have defects, such as lack of charge retention, low five-second voltage and a short or no discharge time interval with sufficient voltage to meet industrial requirements at −65° F.

The watt-hour discharge capacity depends upon a high average discharge voltage. In the past, these have been relatively low because the five-second voltage has been low, which is due in part to the internal resistance of the plates, the weight of the battery or a lack of sufficient plate surface area.

The watt-hour capacity efficiency at high rate discharges on a 45 ampere hour lead-antimony secondary battery at a discharge rate of 50 to 300 amperes at a temperature of 80° F., and especially at temperatures of 0° F., −40° F., and −65° F., have been so low that the efficiency of the battery has been either impaired or has been so reduced that it has failed to perform as desired.

The principal objects of our present invention are:

1. To provide battery plates which will materially reduce the weight of a battery in which they are utilized while maintaining a desired power output and efficiency or of increasing the power output and efficiency of a battery of a given size and weight.

2. To provide battery plates having a high internal electrical conductivity and in which internal electrical resistance is kept at a minimum.

3. To provide battery plates which may be readily flexed without breakage due to the flexibility of the materials from which the grids are formed.

4. To provide a battery plate in which the self-discharge experienced in previously known lead-antimony grids of comparable sizes is reduced by an amount within the range of from approximately 66% to approximately 80%.

5. To provide battery plates having grids which are structurally strong when formed of very thin cross section even of the order of .015" and which have sufficient strength and electrical conducting properties to be effective for use in secondary battery constructions to provide over the temperature range of from 165° F. to −70° F. a five-second voltage which is substantially greater than the five-second voltage provided by a conventional lead-antimony plate battery over the same temperature range.

6. To provide a battery plate in which self-discharge is not appreciably increased even if the lead plating should become somewhat porous in service.

7. To provide a battery plate having a lower internal resistance at low temperatures than antimony-lead plates, hence having a greater power factor at low temperatures and having a higher average discharge voltage over the entire temperature range.

7. To provide a battery plate in which provision is made for securely holding the active materials in the grid after pasting the plates.

8. To provide a battery plate which, because of its thin cross section, permits the use of more plates in a battery of given size and thus providing more plate surface area in a given battery volume than is possible where thicker plates are utilized.

9. To provide a battery plate which, because of its low resistance and increased surface area per given cell volume, provides a battery cell having a higher ampere hour capacity at −65° F. temperature than is provided by batteries having conventional types of antimony-lead plates.

10. To provide a battery plate which when properly assembled into a storage battery uses less lead per battery of a given capacity and power output than is required in conventional types of batteries of comparable capacity and power output using lead-antimony plates.

Other objects of this invention will appear in the following description and appended claims, reference being had to the accompanying drawings forming a part of this specification wherein like reference characters designate corresponding parts in the several views.

In the drawings:

Fig. 1 is an elevation of the grid of the battery plate of the present invention which is preferably formed from flexible lightweight, electrically conductive metals, such for example as aluminum or alloys thereof.

Fig. 2 is an enlarged cross section taken along the line 2—2 of Fig. 1 in the direction of the arrows.

Fig. 3 is a fragmentary elevation of the grid construction after plating with lead and after being pressed.

Fig. 4 is an enlarged cross sectional view taken substantially on the line 4—4 in the direction of the arrows Fig. 3.

Fig. 5 is an elevation of a completed plate in which the active materials have been placed in the openings in the lead coated grid shown in Fig. 3.

Fig. 6 is an enlarged cross sectional view taken substantially on the line 6—6 in the direction of the arrows Fig. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Our invention consists essentially in constructing the battery plates with a central grid element formed from a sheet of a flexible, lightweight, conductive metal such for example, as aluminum, magnesium, or alloys of aluminum or magnesium or the like to provide an inner framework or skeleton which is lighter in weight, and has greater structural strength than a comparable thickness of pure lead or of antimony-lead. The inner framework or skeleton possessing sufficient stiffness and rigidity to permit the use of very thin plates which are thereafter coated with a thin, dense, tightly adherent, fine-grained, substantially non-porous coating of pure metallic lead. The lead coated framework or skeleton may be coated according to any desired process, one suitable process being disclosed in co-pending application Serial Number 289,964, filed May 26, 1952, and owned by our common assignee. The battery plates constructed in this manner are lighter in weight than plates formed of pure lead or antimony-lead for providing the same amount of active surface area. In addition, the plates may be formed of much thinner cross sectional area than conventional grids formed of lead or lead-antimony, thus permitting the use of a greater number of grids in a battery of a given size, resulting in an increased capacity per unit of weight of the battery.

The plates of the present invention therefore may result in the reduction in weight of the battery in which they are used or they may provide increased capacity per given cell volume. By the use of lead-coated aluminum cell posts and lead-coated aluminum cell connectors and plate straps, all welded together with pure lead as disclosed in co-pending application Serial Number 282,342, filed April 15, 1952, and owned by our common assignee, the overall weight of the battery is reduced while the mechanical strength and the electrical conductivity of the plate is increased. The internal resistance of the cell is reduced and the watt-hour capacity at high ampere discharge and sub-zero temperatures per pound of the assembled battery is increased.

The lightweight battery grid of the present invention provides sufficient mechanical strength in the thin lead-plated oxide-pasted finished plate, so that the framework or skeleton of the grid in one embodiment may be of the order of approximately 0.010" thickness of a lightweight electrically conductive flexible material such as aluminum or an aluminum alloy. The thickness of such a grid core may be varied depending on the desired thickness of the final plate and may be used efficiently in battery fabrication. The plates or plated grids are sufficiently flexible that they may be bent to a greater extent than lead-antimony grids or plates of the same thickness without breakage or damage to the grids when subjected to the same stresses or strains under similar treatment or conditions.

The inner framework or skeleton may be fabricated in any desired manner and thus may be either stamped, pressed, extruded, or cast. They may be made of soft, medium or hard aluminum or aluminum alloy stock, or any modification desired, which has been formed into a suitable shape for processing of the plate by either mechanical working, heat treatment, rolling or casting of the stock to form the grid structure therefrom.

The greater the thickness of the lightweight framework or skeleton in the lead coated grid, the greater the saving in the weight of the finished grid. Thus, a perforated aluminum grid as shown in Fig. 1 which is coated with 0.015" thickness of electrolytically deposited lead to produce the grid shown in Fig. 3 will create a saving of approximately 45% of the weight of the finished grid when the grid has an overall thickness of 0.040", while a similar thickness of lead coating applied to a thicker grid skeleton to produce a finished grid which has an overall thickness of 0.080" will show a saving of approximately 58% in weight. This saving in weight also represents a saving in weight over the use of either pure lead or of the lead-antimony alloy used in preparing conventional lead-antimony grids of a similar thickness and design.

The lead coating may be electrolytically deposited on the grid skeleton at current densities of from 75 to 750 amperes per square foot of plating surface by using the process of said co-pending application Serial Number 289,964. The lead deposit so laid down is non-treeing, non-porous and compact. At the high current densities used, the treeing is prevented as therein disclosed by the use of suitable shields, addition agents, and agitation of the bath in any desired manner, coupled with the proper bath temperatures. However, the present invention is not limited to any particular process for depositing the lead plate on the inner framework or skeleton of the grid. The application of the lead coating on the lightweight framework or skeleton may also be accomplished either by spraying, sintering, or dipping or by electrodeposition.

If the electrodeposition process is used, the electrodeposited lead is electrically pure lead and is not contaminated with other metals, hence the storage characteristics and standby characteristics of the batteries are excellent. Many batteries have shown a loss as low as 2% per month for a six month storage period with a correspondingly lower change in the density of the battery acid per day and a lower voltage change per day than is the case with lead-antimony grids under the same conditions of storage and tests.

The discharge cycles to which various lead-plated grids may be subjected without destruction will vary with the thickness of the lead plate on the grid. Usually 0.015" of electrolytically deposited lead will be found to withstand more overcharge cycles than is required by the American Battery Association for similar lead-antimony grids.

The lead coat on the light metal framework or skeleton is applied either directly to such metal or to an intermediate coat of another metal such as nickel, when necessary to meet adhesion problems found in using certain types of aluminum alloys in certain types of lead plating baths.

Referring to the drawings an improved battery plate of the present invention is formed from a thin skeleton or framework 10 of aluminum or magnesium, or any other suitable lightweight flexible electrically conductive material or alloy thereof.

The amount of copper in the material used should be kept low and no copper or brass should be used in the electroplating system because of subsequent electro-diffusion of the copper through any porous barrier coats which may occur and its migration to the surface of the positive and its subsequent plating out on the negative grid. Such copper has been found to discharge the battery on standby tests or while in storage and thus reduces the overall efficiency of the battery in active service.

The inner body or skeleton of the plate is formed from metal stock which is fabricated to provide a plurality of separate paste-receiving openings 11, each of which is surrounded by a continuous framework defining each of the separate paste-receiving openings 11. The framework or skeleton 10 is provided with depending lug members 12 and 13 which extend downwardly from the bottom edge thereof to rest upon a suitable bottom grid support bridge provided in the battery case. Each of the lugs 12 and 13 are approximately twice the length of such lugs as used on conventional grids and thus the body of the grid is held a greater distance from the bottom of the battery case. This provides an extra volume of electrolyte under the bottom of the plates. An upwardly extending elongated lug 14 is provided for connecting the plate with the plate strap when the plate is assembled into a complete battery. The framework or skeleton 10 as shown may be of any desired thickness and provides an electrically conductive network connected with each of the individual openings 11 which contain the active materials.

The grid framework or skeleton 10 as previously described and as shown in Fig. 1 is then provided with a plating of pure lead as shown in Figs. 2 and 4 in which the coated framework or skeleton is indicated generally by the numeral 20. During the lead coating operation, the lead coating is built up to the desired thickness and then overplated to a thickness of approximately 0.001" and it is then pressed to the desired thickness. This increases the apparent density of the lead casting and also forms V notches therein as shown in Fig. 4.

When the plate is pressed after the lead plating operation, the V notch is accentuated and occupies the position indicated by the numeral 21 in Fig. 4.

This V notch feature is a very desirable feature in that it provides for a positive mechanical interlock between the lead coated body or skeleton of the plate and the active materials which are held in the lead coated grid structure 20.

The finished plate is indicated by the numeral 30 and is shown in Figs. 5 and 6. The finished plate consists of the lead coated grid structure 20 as previously described which has been either hand or machine pasted with the active materials so that the active materials, as indicated by the numeral 31, are pressed into and fill each of the openings in the plates and are compacted into the V grooves 21 provided in the lead coated grid structure.

As shown in Fig. 4, the formed skeleton or body 10 is completely covered with the lead plate as indicated by the numeral 22 so that there is no exposed portion of the skeleton or body materials in contact with the electrolyte in the battery.

The final battery plate as shown in Fig. 5 is provided with the downwardly extending lugs 32 and 33, each of which is lead coated and acts to support the battery plate from the battery supporting bridges provided in the bottom of the battery case. The upper plate strap 34 is similarly lead coated and may be burned into the final plate strap using pure lead in this operation.

The provision of the V notches 21 in the lead coated skeleton or body portion also increases the surface area contact between the grid member and the active materials supported therein and hence electrical conductivity between the active materials and the grid is increased. The provision of the electrically conductive body or skeleton thus assures an efficient transfer of electrical energy from the active materials to the battery terminals.

By forming the plates of the present invention out of a thin sheet of aluminum or aluminum alloy, the electrical conductivity of the plates is very high while the weight of the plate is low. The flexibility of the material is such that the plates may be readily bent or flexed without the breakage which frequently occurs when thin plates of lead-antimony construction are used.

The grids of the present invention may be used to carry active materials of any type desired for the particular battery construction in which the plates are to be used. We have used the plates successfully in batteries of the lead-acid type using a sulfuric acid electrolyte. In this instance, if aluminum is used as the skeletal material, it has been found that the plates have a self-sealing effect in that if a porous condition develops in the lead coating or if the lead coating cracks or is otherwise damaged in such a manner as not to fully seal the skeletal portion of the plate, the action of the sulfuric acid electrolyte and the flow of current through the plates will build up a small area of aluminum oxide (or of aluminum silica oxide in the case of certain alloys), which is not thereafter affected by the electrolyte. Thus, unavoidable damage or deterioration in the lead coating of the plates or any slight imperfections in the coating operation, while affecting the efficiency of the plates to some extent, will not cause a breakdown and complete failure of the plate structure.

While the skeletal body structure may be provided with an intervening layer of other metals, it is preferable that the lead coating be formed directly on the skeleton or body structure of the plates without any intervening layer of electroplated metal.

The grid structure itself provides a casing or carrier for the active material used in forming the completed plates. Any desired type of such active material may be employed for this purpose as various such materials are known to those skilled in the art. It is to be understood that the negative grids will be filled with one type of active material, while the positive grids may be filled with another type of active material.

In this manner, it will be seen that we have greatly reduced the weight of the grid skeleton which carries the active materials, and at the same time have reduced the thickness of the plates while increasing the electrical conductivity, flexibility, and strength properties of the plates. Thus, with a given weight of active materials, the battery plate of the present invention will expose a greater amount of the surface of the active materials than is the case if the same weight of active materials is carried by a conventional type of grid structure having an appreciably increased thickness.

Previous attempts to form the battery plates of pure lead have not been successful because the softness of the metal has made it impractical to make the plates as thin as now desired since such thin plates made wholly of lead would bend or break easily. Attempts to fabricate very thin plates of lead-antimony have produced plates very susceptible to breakage and mechanical failures because of the brittleness of the materials. In addition, the lead-antimony establishes an electrical couple in the presence of the electrolyte which causes such plates to have a much higher self-discharge rate than plates of the present invention. Also, such lead-antimony plates which are formed by casting processes and techniques make it impossible to provide a means for holding the active materials in the plate except as the plate thickness is increased to provide spaced locking ribs.

By constructing the grid structure of the plate as herein described, it will be seen that the plates may be made very thin. It is feasible to produce such plates as thin as 0.015" in thickness and as much thicker as may be desired. Thus, it is possible to produce an electrical cell having a high-ampere discharge at sub-zero temperatures at a great saving in weight over conventional constructions or it is possible to increase the output of the cell under these conditions using the same weight of materials as used in conventional battery constructions.

The completed framework or skeleton after pressing and prior to pasting is of a substantially uniform thickness throughout its area, thus uniform thicknesses of the active material pastes are provided in the openings of the plate. The pressing of the plate causes a decrease in the apparent density of the lead coating. Thus, any residual porosity is reduced and the lead coating is densified.

The finished plates may be assembled in the battery by the use of pure lead which will unite and fuse with the lead plate on the strip 34. This establishes an efficient electrical path between the plates and the terminals of the battery.

The thickness of the lead coating on the plates will be determined by the plate life desired. In general, the thicker the lead coating the greater the plate life. We have produced satisfactory plates having a lead coating of from approximately .005" to approximately .020". We have found that a thickness of approximately 0.015" is very satisfactory. Using such coatings we have found that the pure lead changes to lead peroxide at the positive plates in the battery so that the resultant effect is that of a Planté plate but using the conventional Fauer type active material pastes.

The present invention thus provides battery plates of any desired thinness which will give an increased cycling life over that of conventional lead-antimony plates. This is accomplished with substantial savings in weight which, together with the other novel characteristics of the plates, produces a high watt-hour capacity per pound of the finished battery.

Having thus described our invention, we claim:

1. In electrical secondary batteries, a thin plate comprising a grid formed of a lightweight, electrically conductive, flexible, flat metal plate having a plurality of smooth walled apertures formed therethrough, said plate being completely covered with a coat of tightly adherent, non-porous lead, the lead covering being compressed against the flat faces of the plate to densify the lead coat and form V-shaped grooves in said covering in the areas within the apertures, said V-shaped grooves providing a positive mechanical lock for the retention of active material within the apertures.

2. In a method of forming a battery plate the steps which comprise forming a flat plate of a lightweight, electrically conductive, flexible metal, providing a plurality of smooth walled apertures through the flat plate, completely covering said plate with a coating of metallic lead, and compressing said lead covering against the flat faces of the plate to densify the lead and provide V-shaped grooves in said covering in the areas within the apertures.

References Cited in the file of this patent

UNITED STATES PATENTS

| | | |
|---|---|---|
| 441,959 | Kennedy | Dec. 2, 1890 |
| 477,914 | Silvey | June 28, 1892 |
| 543,055 | Rooney | July 23, 1895 |
| 668,517 | Hewitt | Feb. 19, 1901 |
| 715,343 | Blanc | Dec. 9, 1902 |
| 794,501 | Heisser | July 11, 1905 |
| 2,503,970 | Rupp | Apr. 11, 1950 |

FOREIGN PATENTS

| | | |
|---|---|---|
| 21,826 | Great Britain | Oct. 2, 1896 |
| 1,844 | Great Britain | Jan. 26, 1899 |